US012742484B2

(12) United States Patent
Noruschat et al.

(10) Patent No.: US 12,742,484 B2
(45) Date of Patent: Sep. 22, 2026

(54) VIBRATION DAMPERS FOR A VEHICLE

(71) Applicants: thyssenkrupp Bilstein GmbH, Ennepetal (DE); thyssenkrupp AG, Essen (DE)

(72) Inventors: Tim Noruschat, Wuppertal (DE); Nicolas Sumkoetter, Wadersloh (DE); Klaus Schmidt, Odenthal (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 403 days.

(21) Appl. No.: 18/237,783

(22) Filed: Aug. 24, 2023

(65) Prior Publication Data

US 2024/0068540 A1 Feb. 29, 2024

(30) Foreign Application Priority Data

Aug. 25, 2022 (DE) ..................... 10 2022 208 833.6

(51) Int. Cl.
*F16F 9/18* (2006.01)
*F16F 9/348* (2006.01)

(52) U.S. Cl.
CPC ............ *F16F 9/185* (2013.01); *F16F 9/3484* (2013.01); *F16F 2232/08* (2013.01)

(58) Field of Classification Search
CPC ....... F16F 9/185; F16F 9/3484; F16F 2232/08
USPC ............................... 188/315, 322.19, 322.22
See application file for complete search history.

(56) References Cited

U.S. PATENT DOCUMENTS 2,630,193 A 3/1953 Mearick
2,728,419 A 12/1955 Crabtree
5,848,677 A * 12/1998 Beck ....................... F16F 9/367 188/322.22
6,105,945 A 8/2000 Takeuchi et al.
6,213,475 B1 * 4/2001 Schalles .................. F16F 9/067 277/457
11,143,260 B2 10/2021 Deferme
11,320,016 B2 5/2022 Woenarta
11,391,337 B2 * 7/2022 Woenarta ............... B60G 17/08
2012/0073918 A1 3/2012 Nishimura et al.
2014/0291086 A1 10/2014 Suzuki et al.
2020/0173513 A1 * 6/2020 Woenarta ............... F16F 9/067
(Continued)

FOREIGN PATENT DOCUMENTS

DE 11 46 312 B 3/1963
DE 19 74 978 U 12/1967
(Continued)

*Primary Examiner* — Christopher P Schwartz
(74) *Attorney, Agent, or Firm* — thyssenkrupp North America, LLC

(57) ABSTRACT

The disclosure relates to a vibration damper for a vehicle, comprising an outer tube and an inner tube which is arranged coaxially relative thereto, wherein between the outer tube and the inner tube a compensation chamber for receiving hydraulic fluid is formed, and a working piston which is connected to a piston rod and which is arranged so as to be able to be moved back and forth within the inner tube, wherein the inner space of the inner tube is divided by the working piston into a first working chamber and a second working chamber, wherein in the compensation chamber there is arranged a calming element which is fitted so as to be able to be moved in an axial direction inside the compensation chamber.

13 Claims, 5 Drawing Sheets

(56) References Cited

U.S. PATENT DOCUMENTS

| | | | | |
|---|---|---|---|---|
| 2020/0173514 A1* | 6/2020 | Woenarta | ................ | F16F 9/067 |
| 2024/0052906 A1* | 2/2024 | Noruschat | ................ | F16F 9/18 |
| 2024/0200632 A1* | 6/2024 | Noruschat | .............. | F16F 9/185 |

FOREIGN PATENT DOCUMENTS

| | | | | | |
|---|---|---|---|---|---|
| DE | 10 2011 083 744 | A1 | 4/2013 | | |
| DE | 102013008885 | A1 * | 11/2014 | ............ | F16F 9/5126 |
| DE | 10 2018 220 628 | A1 | 6/2020 | | |
| DE | 11 2019 006 471 | T5 | 9/2021 | | |
| DE | 10 2020 008 116 | A1 | 2/2022 | | |
| JP | 852-113474 | A | 9/1977 | | |
| JP | H10-141414 | A | 5/1998 | | |
| JP | 2014-029201 | A | 2/2014 | | |
| WO | 2018/062221 | A1 | 4/2018 | | |

* cited by examiner

VIBRATION DAMPERS FOR A VEHICLE

CROSS REFERENCE TO RELATED APPLICATION

This application is a U.S. Non-Provisional that claims priority to German Patent Application No. DE 10 2022 208 833.6, filed Aug. 25, 2022, and the entire content of which is incorporated herein by reference.

FIELD

The disclosure generally relates to a vibration damper for a vehicle having a calming element.

BACKGROUND

Particularly in vibration dampers which are in the form of multi-tube vibration dampers, it is known to use helical elements. Multi-tube vibration dampers generally do not have a separate gas chamber so that the hydraulic oil and the gas are not hermetically separated from each other. Piston rod movements or accelerations of the hydraulic fluid within the vibration damper lead to relatively powerful fluctuations of the hydraulic oil level.

This often leads to a "bursting" of the hydraulic oil column so that the hydraulic oil and the gas become mixed by means of a foaming action in such a manner that gas reaches one of the working chambers. In such a case, the function of the vibration damper is very limited and the required damping characteristic is no longer achieved.

From the prior art it is known to use a helical element in order to calm the hydraulic oil. DE 11 2019 006 471 T5 discloses, for example, a vibration damper having a helical element. However, the assembly of the helical element within the vibration damper is problematic.

Thus a need exists to provide a vibration damper for a vehicle in which a foaming of the hydraulic fluid is reliably prevented.

BRIEF DESCRIPTION OF THE FIGURES

Further advantageous details, features and details of the disclosure will be explained in more detail in the context of the exemplary embodiments illustrated in the figures, in which.

DETAILED DESCRIPTION

Figure 1:
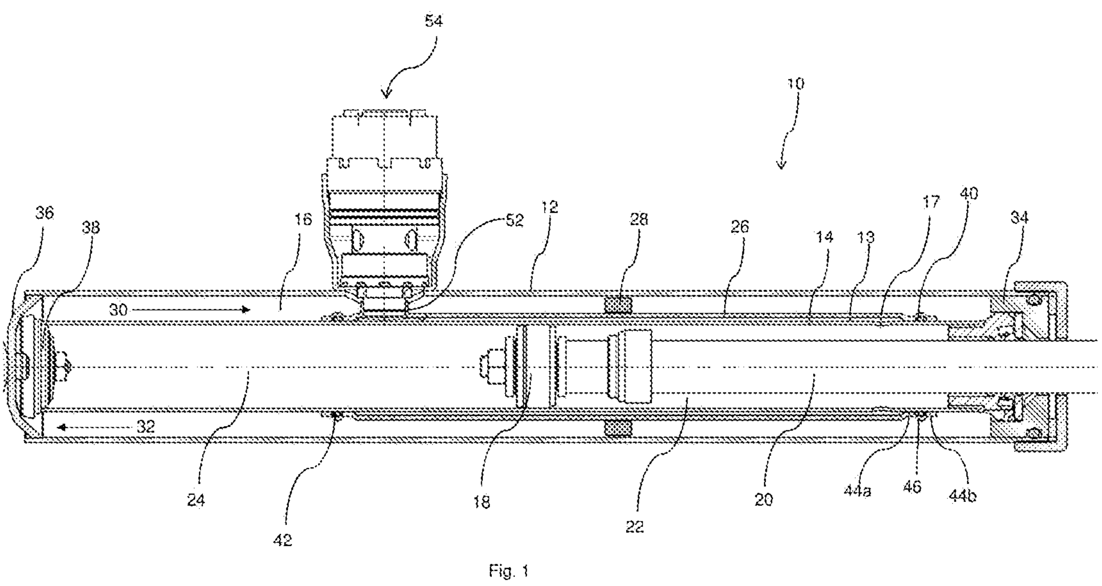
FIG. 1 shows a longitudinal sectioned view of a vibration damper as according the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, a vibration damper for a vehicle comprises an outer tube and an inner tube which is arranged coaxially relative thereto, wherein between the outer tube and the inner tube a compensation chamber for receiving hydraulic fluid is formed, and a working piston which is connected to a piston rod and which is arranged so as to be able to be moved back and forth within the inner tube, wherein the inner space of the inner tube is divided by the working piston into a first working chamber and a second working chamber. In the compensation chamber there is arranged a calming element which is fitted so as to be able to be moved in an axial direction inside the compensation chamber.

Below, the terms "bottom" and "top" are intended to be understood to refer to the directions during correct use of the vibration damper, wherein, for example, the closure assembly and the piston rod are arranged at the top and the base piece and the base valve are arranged at the bottom inside the vibration damper.

The vibration damper is preferably a multi-tube vibration damper, wherein the compensation chamber is partially filled, in particular at the upper end, with a gas. Inside the compensation chamber, a central tube is preferably fitted coaxially relative to the inner tube and the outer tube and in particular secured to the inner tube. The compensation chamber is in particular in the form of an annular space and is delimited by the outer tube and the central tube or the inner tube. The outer tube preferably at least partially forms the housing of the vibration damper. The inner face of the inner tube is preferably in the form of a guide of the working piston. The working piston preferably has a valve device, by means of which the first and the second working chamber are connected to each other.

An annular space is preferably formed between the central tube and the inner tube. The inner tube has in particular at least one through-opening which connects the first, piston-rod-side working chamber to the annular space in technical fluid terms, wherein the through-opening is formed in the first working chamber.

The vibration damper has in particular a closure assembly which is constructed and arranged to seal the inner side of the outer tube at the piston rod side in technical fluid terms. The end of the inner tube on the piston rod is preferably secured to the closure assembly. Opposite the closure assembly, at the side remote from the piston rod, the inner space of the outer tube is preferably sealed in technical fluid terms by means of a base piece. On the base piece, there is particularly arranged a base valve which in particular is fitted at the end of the inner tube remote from the piston rod. The second working chamber is preferably connected to the compensation chamber in technical fluid terms by means of the base valve. The base valve is preferably a non-return valve, through which it is possible to flow in both directions or in only one direction. For example, the base valve in the pulling direction, during a piston movement in the direction out of the inner tube, is in the form of a non-return valve and, in a pressing direction, during a piston movement into the inner tube, is in the form of an identification generating valve.

One central tube is preferably arranged coaxially relative to and between the inner tube and the outer tube. The central tube has, for example, a length which corresponds to approximately from 40% to 90%, in particular 50% to 800% of the length of the inner tube 14.

Preferably, the central tube is fitted to the inner tube by means of a central tube attachment. The central tube is preferably fitted to the inner tube by means of at least one, in particular by means of a first and a second central tube attachment. At least one central tube attachment is arranged at the end of the central tube remote from the piston rod, wherein an additional central tube attachment is arranged, for example, at the end of the central tube on the piston rod. Preferably, the central tube attachment is formed in the central tube. The central tube attachment preferably comprises two constrictions which extend radially inwards at the circumference, wherein in the region of the constrictions the diameter of the central tube is reduced in such a manner that the central tube lies against the inner tube. Between the two constrictions, an annular expansion of the central tube is formed, wherein in the region of the expansion the diameter of the central tube is expanded to the previous diameter outside the constriction. The expansion is preferably constructed in such a manner that it forms between the central tube and the inner tube a closed annular space. There is arranged within the annular space, for example, a sealing element, in particular a sealing ring, which lies against the inner tube and the central tube and which forms a fluid-tight seal between them. The central tube attachment preferably represents a sealing of the central tube, in particular the tube element, against the inner tube. The central tube attachment is in particular constructed in such a manner that it prevents a movement of the tube element in a radial direction relative to the inner tube. In an axial direction, the central tube attachment preferably does not fix the tube element to the inner tube. In particular, the central tube is fixed in an axial direction and in a circumferential direction by the assembly of a valve on the flange region of the central tube.

Preferably, the vibration damper has a damping valve device and the central tube has a flange region for fitting the damping valve device to the central tube. The flange region forms a receiving member for the damping valve device, in particular the flange region forms a fluid inlet and/or fluid outlet of the damping valve device. In particular, the flange region connects the annular region to the damping valve device. The outer tube of the vibration damper preferably has an opening which is aligned with the flange region for receiving the damping valve device so that the damping valve device is connected to the compensation chamber in technical fluid terms. The flange region is, for example, constructed integrally with the central tube and preferably has a circular cross section. The preferably tubular flange region extends in a radial direction outwards from the central tube in the direction of the outer tube.

The calming element is fitted inside the compensation chamber so as to be able to be preferably freely moved in an axial direction. In particular, the calming element can be moved between a position, at which it lies against the base piece, the flange region or a stop, and a position, at which it lies against the closure assembly or a stop. Preferably, the inner face of the outer tube and the outer face of the central tube or the inner tube are in the form of an axial guide of the calming element. A calming element which is fitted in an axially movable manner affords the advantage that the calming element can be moved to the position at which foaming of the hydraulic fluid is carried out.

According to a first embodiment, the calming element has a higher density than the hydraulic flid. Preferably, the calming element is made from a plastics material. For example, the calming element is made from polyamide 6 (PA6) or polyoxymethylene (POM). A higher density of the calming element compared with the hydraulic fluid ensures a descent of the calming element with a flow-free vibration damper when the hydraulic fluid is at rest. Constructing the calming element from a material having a higher density than the hydraulic fluid represents a cost-effective solution for production of the calming element.

For example, the vibration damper has one stop, two or more stops which limit(s) an axial movement of the calming element. The stop is particularly constructed on the central tube, the inner tube or the outer tube and arranged separately from a flange region which receives a valve device.

According to another embodiment, the calming element is constructed in an annular manner and preferably arranged coaxially with respect to the inner tube. The calming element extends in particular in a circumferential direction through the entire compensation chamber. For example, the annular calming element has a cross section which is constant in a circumferential direction. A more uniform lift/negative lift of the calming element when flowed around with hydraulic fluid is thereby achieved.

According to another embodiment, the calming element is arranged with spacing from the inner face of the outer tube. In particular, an annular gap which is filled with hydraulic fluid is formed between the calming element and the outer tube. Such an annular gap is illustrated in the Figures, such as at reference numeral 64 in FIG. 2*c*. Preferably, such an annular gap enables the calming element to slide along the inner face of the outer tube.

According to another embodiment, the central tube is arranged coaxially with respect to the inner tube and within the compensation chamber. According to another embodiment, the calming element is arranged with spacing from the radially outwardly directed face of the central tube. In particular, an annular gap which is filled with hydraulic fluid is formed between the calming element and the central tube. Preferably, such an annular gap enables the calming element to slide along the outer face of the central tube. Preferably, hydraulic fluid can flow completely through one of the annular gaps or both annular gaps and/or hydraulic fluid can flow completely around the entire calming element.

According to another embodiment, the calming element forms a flow resistance within the compensation chamber. The calming element is preferably constructed in such a manner that, when the calming element is subjected to a flow of hydraulic fluid, the flow resistance acting on this when flowing through the compensation chamber in a first flow direction is greater than when the compensation chamber is flowed through in a second flow direction.

The flow resistance is preferably a force which acts on the calming element and which results from the calming element being subjected to a flow of hydraulic fluid. Preferably, the force results in a movement of the calming element in an axial direction depending on the flow direction of the hydraulic fluid. The first flow direction of the hydraulic fluid is preferably a flow from the bottom to the top within the compensation chamber, in particular from the base valve in the direction of the closure assembly. The second flow direction of the hydraulic fluid is preferably a flow from the top to the bottom within the compensation chamber, in particular from the closure assembly in the direction of the base valve. A flow resistance acting in the first flow direction produces in particular a lifting force which moves the calming element upwards in an axial direction, wherein a flow resistance acting in the second flow direction produces a negative lifting force which moves the calming element in a downward direction.

Preferably, the lifting force when the calming element is subjected to a flow in the first flow direction is greater than the negative lifting force when the calming element is subjected to a flow in the second flow direction at the same flow speed.

According to another embodiment, the calming element has a first annular region and a second annular region. The first annular region is preferably arranged above the second annular region.

The second annular region preferably serves to guide, in particular to radially stabilise the calming element during a movement in an axial direction and reliably prevents tilting of the calming element.

According to another embodiment, the first and the second annular regions are arranged with spacing from each other in an axial direction. In particular, the annular regions are arranged coaxially relative to each other and have, for example, the same outer diameter.

According to another embodiment, the first and the second annular regions are connected to each other by means of webs which extend in an axial direction. For example, the calming element has two, three, four or five to ten webs which extend in an axial direction. The webs preferably extend exclusively in an axial direction and are in particular arranged parallel with each other.

For example, the first annular region is arranged in such a manner inside the compensation chamber that a gap is formed in each case relative to the outer tube and the central tube, wherein the gap which is formed relative to the central tube is, for example, greater than the gap which is formed relative to the outer tube.

According to another embodiment, the calming element, in particular the first annular region, has an asymmetrical cross section. In particular, the cross section is formed asymmetrically with respect to an axis of symmetry which extends in a radial direction.

According to another embodiment, the calming element, in particular the first annular region, has a triangular cross section. For example, the cross section is in the form of an equilateral triangle having a base angle of from 40° to 60°, in particular from 50° to 55°, preferably 52°. Preferably, the tip of the triangle faces in an upward direction, in particular in the direction of the closure assembly, wherein the base extends in a radial direction.

It is also conceivable for the calming element, in particular the first annular region, to have a rectangular, square, round, elliptical or polygonal cross section.

The second annular region has, for example, a rectangular cross section. Preferably, the cross sectional surface-area of the second annular region is smaller than the cross sectional surface-area of the first annular region. Preferably, the second annular region forms a smaller flow resistance when a hydraulic fluid flows through the compensation chamber than the first annular region. For example, the second annular region is arranged in such a manner within the compensation chamber that it forms in each case a gap in the direction towards the outer tube and the central tube, wherein the gap which is formed relative to the central tube is, for example, greater than the gap which is formed relative to the outer tube. In particular, the second annular region has the same geometry as the first annular region. Preferably, the second annular region has the same cross sectional geometry as the first annular region.

According to another embodiment, wherein in the downwardly directed face of the calming element, in particular the first annular region, a notch which faces in an axial direction is formed. Such a notch increases the flow resistance of the calming element in the event of a flow in the first flow direction from the bottom to the top in the compensation chamber.

According to another embodiment, the radially inwardly directed face of the calming element, in particular the first annular region, has a profiling. The profiling is preferably formed exclusively on the face, which faces radially inwards in the direction of the central tube, of the calming element and extends, for example, continuously in the circumferential direction. In particular, the profiling comprises a plurality of annular notches which in particular have a cross section which expands upwards in the direction of the closure assembly. The annular notches are, for example, arranged coaxially with respect to each other and are in particular constructed identically. Such a profiling increases the flow resistance when the compensation chamber is flowed through in the first flow direction.

FIG. 1 shows a vibration damper 10, wherein the vibration damper 10 is a multi-tube vibration damper, for example, a two-tube vibration damper. The vibration damper 10 has an outer tube 12 which forms an outer face, in particular a housing, of the vibration damper 10. Within the outer tube 12, an inner tube 14 is arranged coaxially thereto. There is formed between the outer tube 12 and the inner tube 14 a compensation chamber 16 which is preferably at least partially filled with a hydraulic fluid. Preferably, the compensation chamber 16 is partially filled with a gas.

A working piston 18 which is connected to the piston rod 20 is arranged within the inner tube 14 in such a manner that it can be moved within the inner tube 14, wherein the inner tube is preferably in the form of a guide of the working piston 18. The working piston 18 preferably has a valve device. The working piston 18 divides the inner space of the inner tube 14 into a first working chamber 22 which is arranged at the piston rod side and a second working chamber 24 which is arranged remote from the piston rod. Within the compensation chamber 16, a central tube 26 is arranged coaxially with respect to and between the inner tube 14 and the outer tube 12.

The inner space of the outer tube 12 is sealed at the piston rod side by means of a closure assembly 34 in technical fluid terms. Opposite the closure assembly 34, at the end remote from the piston rod, the inner space of the outer tube 12 is sealed in technical fluid terms by means of a base piece 36. On the base piece 36, for example, there is arranged a base valve 38 which is fitted in particular at the end, remote from the piston rod, of the inner tube 14. The base valve 38 is preferably a non-return valve which can be flowed through in both directions or in only one direction. For example, the base valve 38, in a pulling direction, with a piston movement in the direction out of the inner tube, is in the form of a non-return valve, and in a pressing direction, with a piston movement into the inner tube, in the form of an identification generating valve. The second working chamber 24 is preferably connected in technical fluid terms to the compensation chamber 16 by means of the base valve 38. The piston-rod-side end of the inner tube 14 is preferably secured to the closure assembly 34.

The central tube 26 has by way of example a length which corresponds to approximately from 50 to 80% of the length of the inner tube 14. The central tube 26 is in particular fitted to the inner tube 14 by means of a first and a second central tube attachment 40, 42. The first central tube attachment 40 is arranged at the end of the central tube 26 remote from the piston rod and the second central tube attachment 42 is arranged at the end of the central tube 26 on the piston rod. Preferably the central tube 26 is fitted directly to the inner tube 14. The central tube attachment 40, 42 preferably comprises two constrictions 44*a, b* which extend radially inwards at the circumference, wherein in the region of the constrictions 44*a, b* the diameter of the central tube 26 is reduced in such a manner that the central tube 26 lies against the inner tube 14. The axially inward, first constriction 44*a* is adjoined by an in particular annular expansion 46 of the inner tube 14, wherein in the region of the expansion 46 the diameter of the central tube 26 is expanded to the previous diameter outside the constriction 44. The expansion 46 is adjoined in an axial direction outwardly by the second constriction 44*b* and forms the end of the central tube 26. With the exception of the central tube attachment 40, 42, the central tube 26 preferably has a constant diameter and cross section. The expansion 46 is preferably constructed in such a manner that it forms a closed annular space between the central tube 26 and the inner tube 14. Within the annular space there is arranged, by way of example, a sealing element, in particular a sealing ring, which lies against the inner tube 14 and the central tube 26 and which forms a fluid-tight seal therebetween. Preferably, the first and the second central tube attachment 40, 42 each have an annular space having a sealing ring. The expansion 46 and constrictions 44*a,b* are preferably formed in the central tube.

An annular space 13 is formed between the central tube 26 and the inner tube 14. In the inner tube 14 there is formed at least one through-opening 17 which connects the first working chamber 22 to the annular space 13. The through-opening 17 is formed in the first working chamber 22.

The central tube 26 is preferably made from a metal. For example, the central tube 26 has a flange region 52 for fitting a damping valve device 54 to the central tube 26. The flange region 52 is, for example, constructed integrally with the central tube 26 and preferably has a circular cross section. The preferably tubular flange region 52 extends in a radial direction outwards from the central tube 26, in the direction of the outer tube 12. The flange region 52 forms a receiving member for the damping valve device 54, in particular the flange region 52 forms a fluid inlet and/or fluid outlet of the damping valve device 54. The flange region 52 connects the annular space 13 to the damping valve device 54. The outer tube 12 preferably has an opening which is in alignment with the flange region 52 for receiving the damping valve device 54 so that the damping valve device 54 is connected to the compensation chamber 16 in technical fluid terms.

A calming element 28 is arranged in the compensation chamber 16. The calming element 28 preferably has a higher density than the hydraulic fluid so that it does not float within the hydraulic fluid and in particular falls in a flow-free state of the vibration damper 10 in a downward direction, in the direction of the flange region 52. The calming element 28 is, for example, formed in an annular manner and arranged between the outer tube 12 and the central tube 26. Preferably, the calming element 28 is fitted with spacing from the central tube 26 and the outer tube so that, between the calming element 28 and the outer tube 12 and between the calming element 28 and the central tube 26, a gap which is filled with hydraulic fluid is formed. The calming element 28 is in particular fitted so as to be able to be moved in an axial direction inside the compensation chamber 16 so that it is supported so as to be able to slide preferably along the inner face of the outer tube 12 and the outer face of the central tube 26 in an axial direction.

For example, an axial stop not illustrated in FIG. 1 is fitted inside the compensation chamber 16 so that the movement of the calming element 28 in an axial direction is limited by the stop. For example, such a stop is fitted in an axial direction from the closure assembly in the direction of the base valve 38 in front of the flange region 52 in order to prevent the calming element 28 from striking the flange region 52. In the embodiment of FIG. 1, the flange region 52 forms an axial stop for the calming element 28.

The annular calming element 28 preferably has a constant cross section. For example, the cross section is constructed to be quadrangular, in particular rectangular or square. Hydraulic fluid can preferably flow through the compensation chamber 16 in a first flow direction 30 and in a second flow direction 32. The first flow direction 30 of the hydraulic fluid is preferably adjusted at the pressure stage of the vibration damper 10 when the working piston 18 is introduced into the inner cylinder 14. The first flow direction 30 faces in the compensation chamber 16 from the bottom to the top, in particular from the base valve 38 in the direction of the closure assembly 34. The second flow direction 32 of the hydraulic fluid is preferably adjusted at the pulling stage of the vibration damper 10 when the working piston 18 is moved outwards in an axial direction in the inner cylinder 14. The second flow direction 32 faces in the compensation chamber 16 from the top to the bottom, in particular from the closure assembly 34 in the direction of the base valve 38. In the upper region of the compensation chamber 16 adjacent to the closure assembly, a gas volume is received.

FIGS. 2*a* to 2*e* show other embodiments of a calming element 28 inside the compensation chamber. The calming element 28 of FIG. 2 has a triangular cross section. For example, the cross section is in the form of an equilateral triangle. In particular, the calming element 28 forms a flow resistance for the hydraulic fluid within the compensation chamber 16. Preferably, the calming element 28 is constructed in such a manner that, when the hydraulic fluid flows through the compensation chamber 16 in the first flow direction 30, a greater flow resistance is formed than when the hydraulic fluid flows through the compensation chamber 16 in the second flow direction 32. During operation of the vibration damper 10, such a calming element 28, when the hydraulic fluid flows through the compensation chamber 16 in the first flow direction 30, is acted on with a lifting force which preferably ensures that the calming element 28 is moved upwards in the direction of the closure assembly 34. Preferably, the calming element 28 when the hydraulic fluid flows through the compensation chamber 16 in the first flow direction 30 is moved as far as the separation face between the hydraulic fluid and the gas.

Figures 2A, 2B:
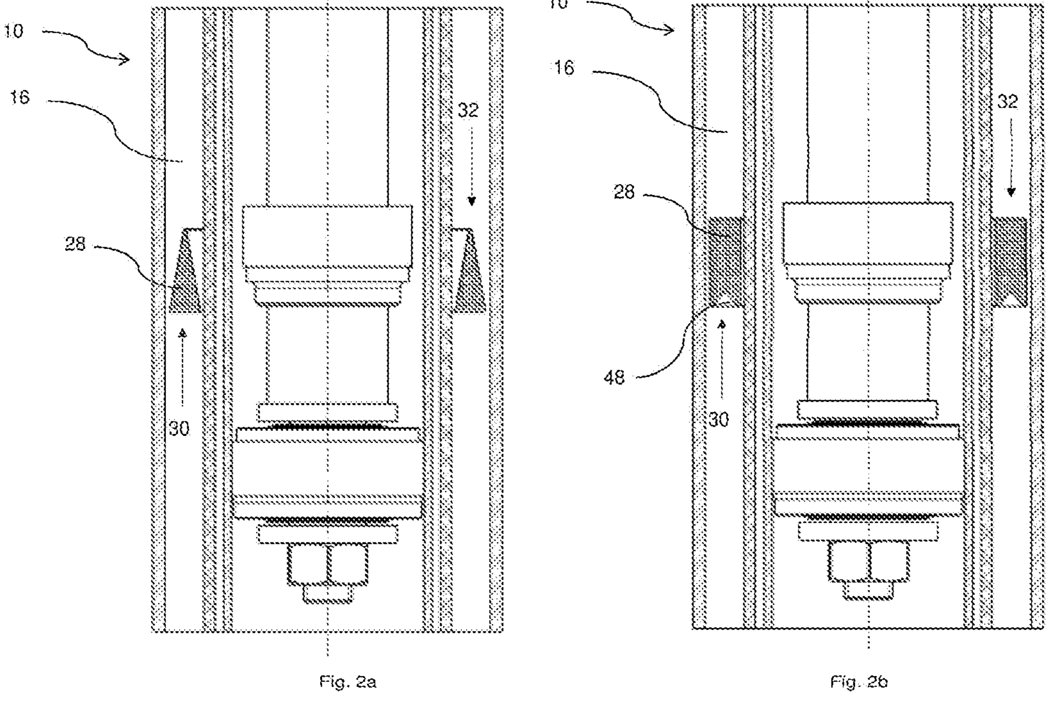
FIGS. 2*a-e* show a longitudinal sectioned view of a cut-out of a vibration damper according to the disclosure.

FIG. 2*b* shows another exemplary embodiment of a calming element 28, wherein the calming element 28 is, for example, constructed in an annular manner and has a rectangular cross section. At the face of the calming element 28 facing in the direction of the base piece 36, it has a notch 48 which extends, for example, continuously at the circumference in a circular ring. The notch has, for example, a triangular cross section. Such a notch 48 ensures that the downwardly facing face of the calming element 28 forms a greater flow resistance than the upwardly facing face of the calming element 28, wherein the upwardly facing face of the calming element 28 has no notch.

Figure 2D:
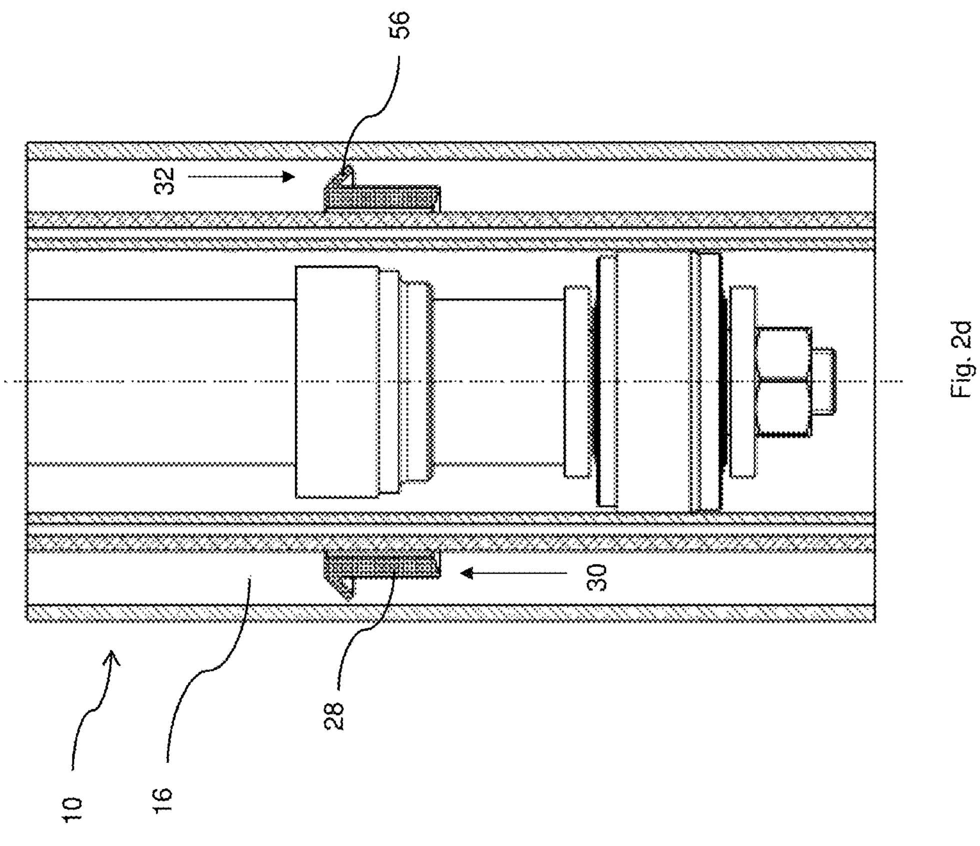
Figure 2C:
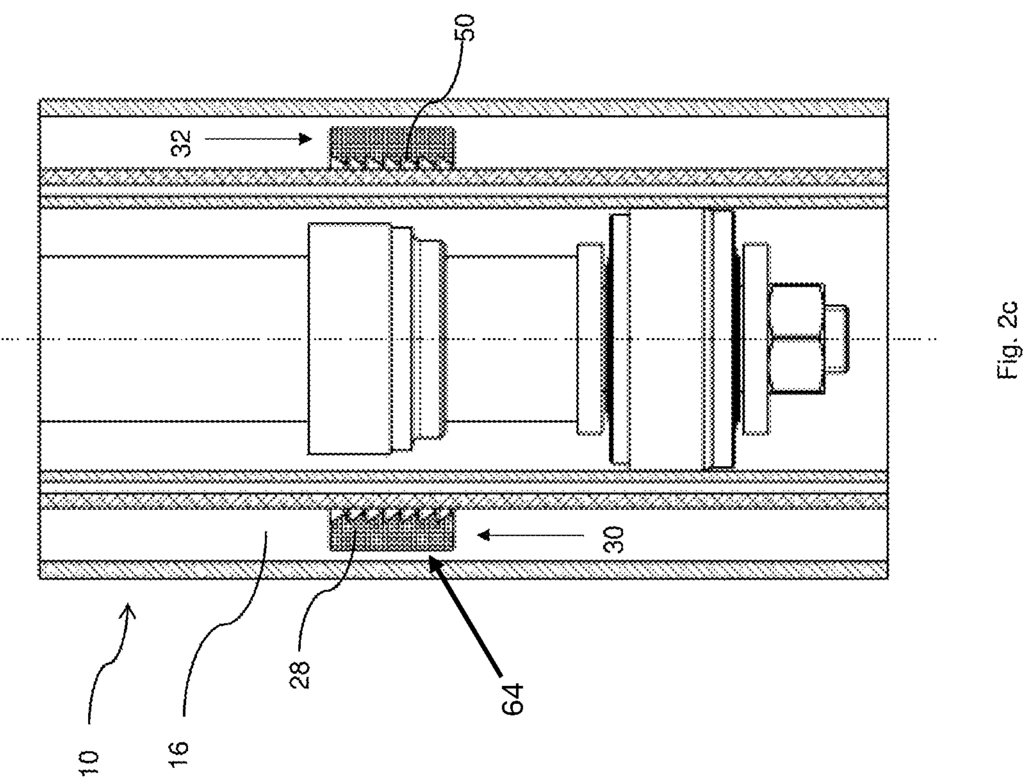

FIG. 2*c* shows another exemplary embodiment of a calming element 28. The calming element 28 has, for example, a rectangular cross section, wherein the radially inwardly directed face of the calming element 28 has a profiling 50. The profiling 50 is preferably constructed exclusively on the face of the calming element 28 directed radially inwards in the direction of the central tube 26 and extends, for example, continuously in a circumferential direction. For example, the profiling 50 comprises a plurality of annular notches which in particular have a cross section which expands upwards in the direction of the closure assembly 34. The annular notches are, for example, arranged coaxially with respect to each other and in particular constructed identically.

FIG. 2*d* shows another exemplary embodiment of a calming element 28. The calming element 28 has, for example, a cross section having a rectangular region and a collar 56 which is adjacent thereto in a radial direction. The collar 56 extends, for example, at an angle of from 30 to 60°, in particular 45°, with respect to the axial.

Figure 2E:
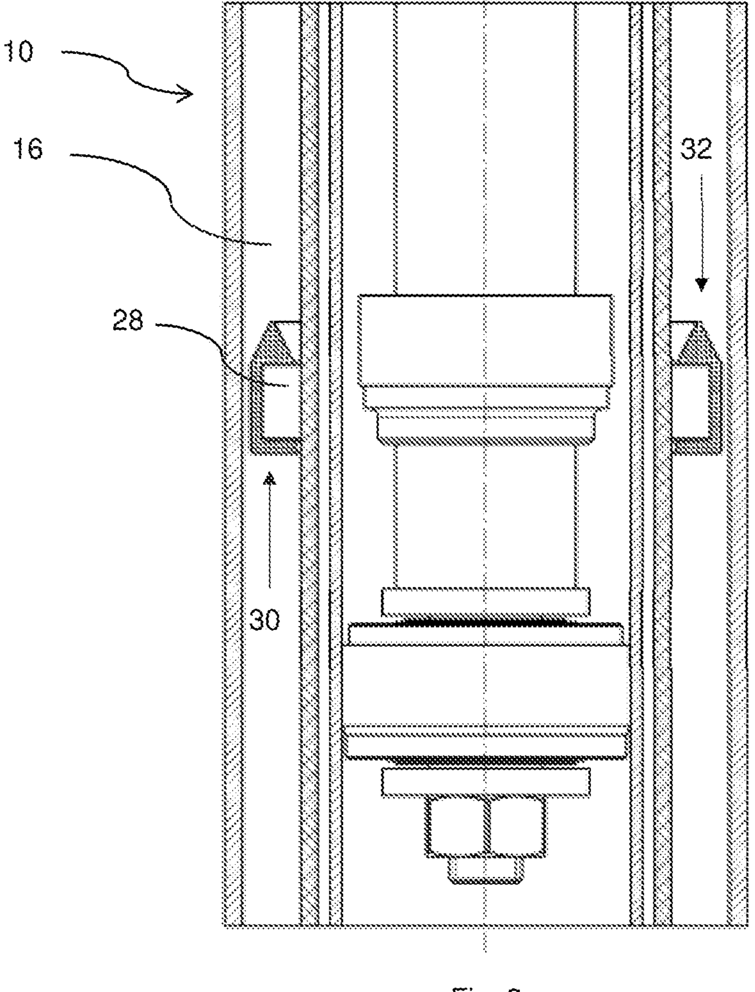

FIG. 2*e* shows another exemplary embodiment of a calming element 28. The calming element 28 has, for example, a cross section having a rectangular region and a triangular region which is adjacent to the upper end. The rectangular cross sectional region has, for example, a recess which extends from the radially inwardly directed face and which is, for example, constructed in a rectangular manner.

Figures 3A, 3B:
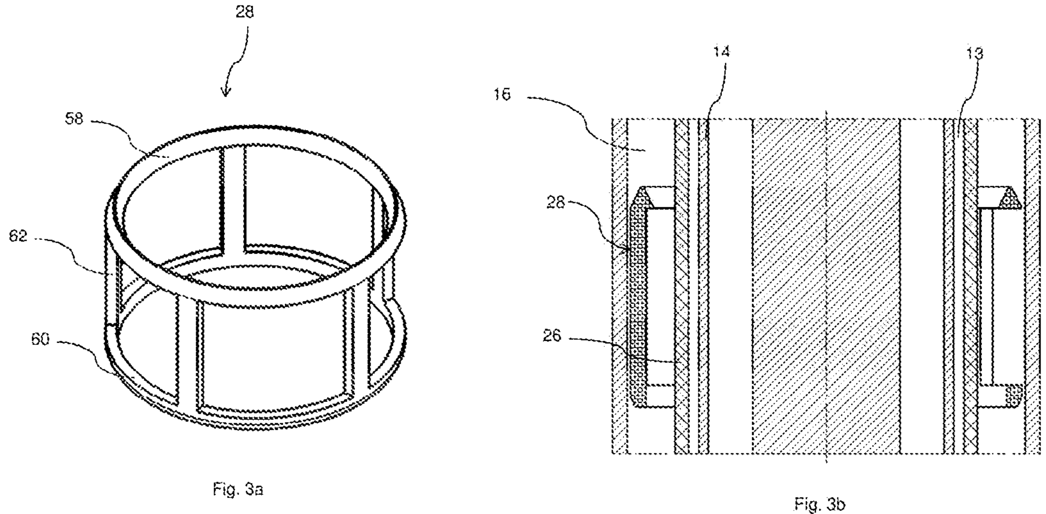
FIG. 3*a* shows as a perspective view of a calming element according to the disclosure.
FIG. 3*b* shows a longitudinal sectioned view of a cut-out of a vibration damper having the calming element of FIG. 3*a*.

FIGS. 3*a* and *b* show another exemplary embodiment of a calming element 28. The calming element 28 has, for example, two annular regions 58, 60, wherein the first annular region 58 is arranged above the second annular region 60. The annular regions 58, 60 are, for example, coaxial with respect to each other and spaced apart from each other in an axial direction. Preferably, the two annular regions 58, 60 are connected to each other by means of at least one axial web 62 or a plurality of axial webs 62. For example, the calming element 28 of FIGS. 3*a* and *b* has five webs 62 which extend in an axial direction. The webs 62 preferably extend exclusively in an axial direction and are in particular arranged parallel with each other.

The first annular region 58 has, for example, a triangular cross section. It is also conceivable for the first annular region 58 to have one of the cross sections of the calming element 28 as shown in FIGS. 2*a* to *e*.

The second annular region 60 has, for example, a rectangular cross section and serves in particular to guide the calming element 28. Preferably, the cross sectional surface-area of the second annular region 60 is smaller than the cross sectional surface-area of the first annular region 58. Preferably, the second annular region 60 has a smaller flow resistance when a hydraulic fluid flows through the compensation chamber 16 than the first annular region 58. For example, the second annular region 60 is arranged in such a manner inside the compensation chamber 16 that it forms in each case a gap with respect to the outer tube 12 and the central tube 26, wherein the gap which is formed with respect to the central tube 26 is, for example, greater than the gap formed with respect to the outer tube 12.

For example, the first annular region 58 is arranged in such a manner inside the compensation chamber 16 that it forms in each case a gap with respect to the outer tube 12 and the central tube 26, wherein the gap which is formed with respect to the central tube 26 is, for example, greater than the gap formed with respect to the outer tube 12.

LIST OF REFERENCE NUMERALS

10 Vibration damper
12 Outer tube
13 Annular space
14 Inner tube
16 Compensation chamber
17 Through-opening
18 Working piston
20 Piston rod
22 First working chamber on piston rod
24 Second working chamber remote from piston rod
26 Central tube
28 Calming element
30 First flow direction
32 Second flow direction
34 Closure assembly
36 Base piece
38 Base valve
40 Central tube attachment
42 Central tube attachment
44*a,b* Constrictions
46 Expansion
48 Notch
50 Profiling
52 Flange region
54 Damping valve device
56 Collar
58 First annular region
60 Second annular region

What is claimed is:

1. A vibration damper for a vehicle, comprising:
an outer tube and an inner tube arranged coaxially relative thereto, wherein a compensation chamber configured for receiving hydraulic fluid is formed between the outer tube and the inner tube; and
a working piston connected to a piston rod and configured to be moved back and forth within the inner tube, wherein the inner space of the inner tube is divided by the working piston into a first working chamber and a second working chamber, wherein a calming element in the compensation chamber is configured to be moved in an axial direction;
wherein, in operation, the hydraulic fluid can flow through an annular gap around the calming element through the compensation chamber;
wherein the calming element forms a flow resistance within the compensation chamber and wherein the calming element is arranged such that the flow resistance when the compensation chamber is flowed through in a first flow direction is greater than when the compensation chamber is flowed through in a second flow direction.

2. The vibration damper of claim 1, wherein the calming element has a higher density than the hydraulic fluid.

3. The vibration damper of claim 1, wherein the calming element is constructed in an annular manner and is arranged coaxially with respect to the inner tube.

4. The vibration damper of claim 1, wherein the calming element is arranged with spacing from the inner face of the outer tube.

5. The vibration damper of claim 1, further comprising a central tube arranged coaxially with respect to the inner tube and within the compensation chamber.

6. The vibration damper of claim 5, wherein the calming element is arranged with spacing from the radially outwardly directed face of the central tube.

7. The vibration damper of claim 1, wherein the calming element has a first annular region and a second annular region.

8. The vibration damper of claim 7, wherein the first and the second annular regions are arranged with spacing from each other in an axial direction.

9. The vibration damper of claim 7, wherein the first and the second annular regions are connected to each other by webs which extend in an axial direction.

10. The vibration damper of claim 1, wherein the calming element includes an asymmetrical cross section.

11. The vibration damper of claim 1, wherein the calming element includes a triangular cross section.

12. The vibration damper of claim 1, wherein the downwardly directed face of the calming element includes a notch in an axial direction.

13. The vibration damper of claim 1, wherein the radially inwardly directed face of the calming element includes a profiling.

* * * * *